3,080,346
SUSTAINED-RELEASE PHARMACEUTICAL
PREPARATIONS
Wolf-Dietrich Schellenberg, Helmut Kramer, Herbert Bartl, and Hans Hofer, Leverkusen-Bayerwerk, Germany, assignors to Farbenfabriken Bayer Aktiengesellschaft, Leverkusen, Germany, a corporation of Germany
No Drawing. Filed Oct. 9, 1959, Ser. No. 845,315
Claims priority, application Germany Nov. 15, 1958
2 Claims. (Cl. 260—78.5)

This invention relates to unique sustained-release pharmaceutical preparations. More particularly, the invention contemplates the provision of orally administrable sustained-release compositions in the form of either solids or liquids in which the protracted or sustained activity of the active pharmaceutical agent is achieved through the use of gastric juice-resistant, enterically soluble protective layers of copolymers formed by the polymerization of approximately equimolar amounts of a half-ester of an $\alpha,\beta$-unsaturated dicarboxylic acid and a water-insoluble vinyl compound in the presence of a small amount of acrylic and/or methacrylic acid.

The coating of pharmaceutical preparations such as tablets, capsules, pills and the like requires the use of substances that are soluble in organic solvents. The coating agents should form smooth, clear films which, on the one hand, must not stick at moderately elevated temperatures and, on the other hand, should not be too brittle. In addition, the compounds or compositions should be compatible with as many excipients, such as softeners and flavoring agents, as possible. The coating agents of choice are also required to be resistant to dilute aqueous acids and to dissolve only in an aqueous alkaline medium. Their differential behavior toward dilute acids and bases, respectively, should be quite pronounced, i.e., the substances should be completely inert to aqueous media of e.g. pH 5 over prolonged periods, whereas they should dissolve rapidly forming clear solutions, in aqueous sodium bicarbonate solution, for example. Lastly, protracted storage should leave the coatings substantially unchanged with respect to their reactions to acids and bases.

Heretofore, numerous substances have been proposed in an effort to meet the foregoing exacting requirements. Thus, German Patent No. 644,759 describes the use of film-forming, water-insoluble polymers containing acid groups, or their functional derivatives, for coating pharmaceutically active agents that are to be protected against the attack of gastric acid and gastric enzymes. The specification of this patent describes as suitable starting materials for such products copolymers of vinyl butyl ether and maleic anhydride, acrylonitrile and methyl acrylate, styrene and butyl acrylate, as well as styrene and maleic anhydrides. All of these copolymers are initially converted into alkali salts by reaction with alkali solution, and these salts must be converted, in turn, into the acid form of the copolymer by the addition of acids before they can be used as coating materials for pharmaceutical purposes. Apart from the relatively expensive manufacturing procedures required for the production of such products, they are noticeably defective with respect to the performance criteria enumerated hereinbefore. For example, the acid products obtained from a copolymer of styrene and maleic anhydride are not sufficiently resistant to dilute acids, such that the medicaments must be coated with relatively thick layers of these agents to protect the active agent against the action of gastric juices. In addition, these thick coatings do not dissolve sufficiently fast enough in the intestine, particularly in view of their tendency to afterharden. In an effort to mitigate against the effects of this drawback, German Patent No. 939,047 suggests the use of mixtures consisting of (1) sparsely water-soluble to water-insoluble film-forming polymers and (2) polymers with acid groups. The main components of these mixtures may be polymethacrylic acid as the acid group carrier and poly(vinyl acetate), poly(vinyl chloride), or polymethacrylates as film formers. Our investigations have demonstrated that these products, too, are unsuitable, owing to the fact that the acid resistance of the coatings prepared with such substances gradually declines, with the result that the active ingredient is generally prematurely released in the stomach. Furthermore, these coating agents are found to be incompatible with various active agents, such as p-aminosalicylic acid, for example, so that the coatings become spotty and porous with time.

The present invention is based on our discovery that the copolymers obtained by polymerization of approximately equimolar amounts of a hemi-ester of an $\alpha,\beta$-unsaturated dicarboxylic acid and a water-insoluble vinyl compound in the presence of a small amount of acrylic or methacrylic acid are extremely well adapted for use as sustained-release coatings for pharmaceutical preparations.

Suitable hemi-esters of $\alpha,\beta$-unsaturated dicarboxylic acids which may be employed in the production of the coating compositions of the invention include maleic and fumaric hemi-esters as well as the half-esters of itaconic acid with alcohols such as methanol, ethanol, isopropanol, butanol, hexanol or octanol.

Suitable water-insoluble vinyl compounds that may be utilized in the practice of our invention include styrene and its derivatives, vinyl esters, acrylic esters, methacrylic esters, or vinyl chloride. The copolymeric coatings may be closely adapted or regulated to practical requirements by variation of these monomers.

We have found that particularly well suited for coating agents are the ternary copolymers prepared with the use of styrene, methacrylic acid, and the butyl half-ester of maleic acid, since the films obtained with these materials are characterized by a particularly high mechanical resistance, excellent gastric stability, and high alkali-solubility. Particularly versatile copolymers are obtained when 1.1 moles of the vinyl compound and not more than 0.1–0.3 mole of the $\alpha,\beta$-unsaturated aliphatic monocarboxylic acid per mole of butyl half-ester of maleic acid are polymerized.

The copolymeric coating compositions of the invention may be prepared by conventional methods. We have found that a very advantageous method is polymerization in solution, for under these conditions the same solvent medium can be employed subsequently for coating of the active medicament. Suitable solvents include esters, ketones, alcohols, or mixtures of the same. Catalysts (activators) promoting radical formation may be used in this type of polymerization including, for example, peroxides, hydroperoxides, azo compounds, as well as inorganic "per" compounds such as hydrogen peroxide. Preferably, the activators used should be such that their decomposition products are physiologically innocuous—e.g. benzoyl peroxide—for under these circumstances purification of the resulting polymer solution is not necessary.

If the ternary copolymers are in solid form, the coatings are effected by preparing ten percent solutions of the copolymers in organic solvents. The most suitable solvents for this purpose are esters, ketones, low aliphatic hydrocarbon halides, alcohols, and mixtures of these solvents. Plasticizers may be added to these solutions in amounts within the range of from 0.5 to 2.0 percent by weight. Examples of advantageous plasticizers include fatty oils, fatty acids, glycols, polyhydric alcohols, solid hydrocarbons, or other substances such as dioctyl phthalate, sorbitan trioleate, or glycerol monostearate.

If the copolymers are prepared in the form of 20–30 percent solutions, these are best diluted to a solids content of about 10 percent by weight with the aid of the solvents enumerated above. Here also, plasticizers of the class described may be added to these solutions.

The modified copolymer solutions may then be applied to formed medicaments such as tablets, pills or granulates in the conventional types of coating kettles. In general, it is found that 10–20 percent by weight of these solutions is sufficient to impart the desirable gastic stability to the coated products.

The copolymeric coatings of our invention may also be used to coat pharmaceutically active substances and commonly used inert auxiliaries of powdery, crystalline or granular consistency, or mixtures thereof. Preferably, spray-drying techniques are employed if the particle size of the coated material is critical or important. Active substances treated in this manner are well suited, for example, for the preparation of suspensions containing an active medicament in a gastric-stable form.

In the preparation of granulates that are to be used as such or in the form of pressed shapes, the auxiliaries and/or the active ingredient or mixture of active ingredients is impregnated with a solution of the specified copolymers, after which the solvent is completely or partially removed, and the residue is processed into a granulate, from which the remaining solvent is then removed.

In addition to their excellent gastric resistance, the products coated in accordance with our invention can be formed as desired into stable shapes of good mechanical strength without any further admixture. No binders need be added for purposes of ganulation. Despite the fact that the active agents thus coated show good resistance in the stomach, they are released without delay in the intestinal juices, whereas such release is very frequently delayed in the case of known coating materials.

Still another application for the copolymeric coatings materials of the invention consists in dissolving them in the solvents specified, but in a ratio of 1:4 together with solid hydrocarbons such as solid paraffin or waxes or with glycerol monostearate and aliphatic fatty acids of high valency. When these solutions are applied to pressed shapes by the usual methods, thin, even coatings are obtained which possess excellent gastric stability and have the added advantage of masking a poor tasting medicament so effectively that subsequent coating with sugar (i.e., dragees), becomes unnecessary.

In addition to their pronounced resistance to gastric juices and ready solubility in the juices of the small intestine, the copolymeric coating compositions of the invention are highly compatible with a variety of chemical substances normally administered via the oral route including, for example, p-aminosalicylic acid. In no case during protracted testing of the coatings was their acid resistance or solubility in alkaline media observed to diminish with time as characteristically occurs with known forms of coatings.

It is believed that our invention may be best understood by reference to the following specific examples showing the application of the foregoing principles and procedures to the preparation of typical coated compositions.

In these examples, the copolymer employed was prepared in the following manner: Nine thousand (9000) grams of butylmaleate half-ester were introduced into an autoclave of 40 liters capacity. The autoclave was closed, and oxygen-free nitrogen was introduced. At the same time, the half-ester was heated to 105° C. while stirring. Thereafter, over a five (5) hour period, a solution was added consisting of 11,080 grams of dioxan, 6920 grams of styrene, 1000 grams of anhydrous methacrylic acid and 51 grams of benzoyl peroxide. The resulting mixture was stirred for an additional fifteen (15) hours at 105° C. The resulting solution of the interpolymer in dioxan can be employed directly for coating pharmaceutical preparations, or, it can be purified further by introducing the solution into five times the amount of methanol and filtering the resulting dilute solution.

*Example I*

Fifty (50) parts by weight of a 20 percent solution of the foregoing copolymer in butyl acetate, 2 parts by weight of castor oil, and 50 parts by weight of acetone were mixed with the aid of an agitator until completely dissolved. Fifteen thousand (15,000) parts by weight of p-aminosalicylic acid cores weighing 0.46 gram each were introduced into a coating kettle, which was then rotated. About 800 parts by weight of a 5 percent solution of gelatin in an approximately 66 percent sugar solution were twice applied to the revolving cores, using 300 parts by weight of talcum for dusting each time. The cores were then dried in a circulating-air cabinet at 30° C. over 12 hours.

The partly coated, dry cores were then gradually coated in the same kettle with 3000 parts by weight of the foregoing copolymeric coating solution, with alternate air-blowing at 30° C., and light powdering with talcum. Thereafter, the cores were once again dried with circulating air at 30° C. over 12 hours.

The foregoing cores were tested in synthetic gastric juice at 37° C. in a digestion testing apparatus of commercial design. After 2 hours they remained undissolved. When subsequently treated in the same apparatus with synthetic intestinal juice at 37° C., they disintegrated within 30–45 minutes. The synthetic solutions employed in these tests had the following respective compositions.

Gastric juice:
  2.0 grams pepsin (Pharmacopeia)
  Ad 1 liter N/10 HCl
Intestinal juice:
  10 grams sodium bicarbonate
  2 grams pancreatin
  Ad 1 liter aq. dest.

*Example II*

Ten (10) parts by weight of the copolymer described hereinbefore, 2 parts by weight of castor oil, 0.5 part by weight of dioctyl phthalate, and 60 parts by weight of acetone were mixed by means of an agitator until completely dissolved. Then 30 parts by weight of carbon tetrachloride were added, and the whole batch was well mixed again. Fifteen thousand (15,000) parts by weight of phenylethylbarbituric acid granulate with a grain size of about 2 mm. were precoated in the same manner as described in Example I with 2 x 1000 parts by weight of a gelatin-sugar solution and 500 parts by weight of talcum, and then dried.

About 3000 parts by weight of the foregoing copolymeric coating solution were applied to the granulates in a revolving coating kettle, half being poured over the granulates and half sprayed on by means of an electric spray gun. Intermediately, small amounts of air at 30° C. were blown in, and from time to time, a small amount of talcum was sprinkled on. The resulting coated granulates were dried in an air-circulating cabinet at 30° C. for twelve (12) hours.

When tested in the same manner as described in Example I, this product shows a gastric stability of 2 hours. In the synthetic intestinal juice it disintegrates in about 30 minutes.

*Example III*

Two-hundred-fifty (250) parts by weight of 7-chloro-4 - (4' - diethylamino-1'-methyl-butylamino)-quinoline diphosphate, 20 parts by weight of the foregoing copolymer dissolved in 120 parts by weight of acetone, 5 parts by weight of stearic acid DAB 6 (Pharmacopeia), dissolved in 10 parts by weight of carbon tetrachloride, and 5 parts by weight of castor oil (DAB 6) were admixed. The solvents were removed until the paste had a crumbly consistency. This paste was then passed through a granulator (inside mesh diameter: 1 mm.). The residual solvent was removed by drying with circulating air.

The resulting dry granulates were formed on a press into circular, biconvex tablets with a diameter of 7.5 mm. and a weight of 280 milligrams.

When tested in the same apparatus and by the same procedure as described in Example I, the tablets released all their active agent within the intestinal juice within 2 hours.

*Example IV*

Five (5) parts by weight of the same copolymer, 1 part by weight of castor oil, 60 parts by weight of isopropanol, and 40 parts by weight of acetone were intermingled while stirring until completely dissolved. Fifteen (15) parts by weight of stearic acid, 2.5 parts by weight of solid paraffin of melting point 58° C., and 2.5 parts by weight of glycerol monostearate were fused together and dissolved in 30 parts by weight of acetone. The two solutions were then combined. Before use, the resulting solution was heated on a water bath until completely clear.

About 4000 parts by weight of this solution was slowly poured over 15,000 parts by weight of 7-chloro-4-(4'-diethylamino-1'-methylbutylamino)-quinoline diphosphate tablets weighing 0.4 gram each, within a revolving coating kettle. Warm air (30° C.) was briefly blown into the kettle at intervals. The coated tablets were dried in an unheated circulating air cabinet over 12 hours.

When tested in accordance with the procedure described in Example I, these tablets resisted the gastric juice for 2 hours, whereas they disintegrated in the intestinal juice within 15–30 minutes. Further coating of these tablets is unnecessary.

Having thus described the subject matter of our invention, what it is desired to secure by Letters Patent is:

We claim:

1. A coating composition for imparting gastric stability and enteric solubility to oral pharmaceutical agents, that comprises a ternary copolymer of styrene, methacrylic acid, and the butyl half-ester of maleic acid.

2. A coating composition for imparting gastric stability and enteric solubility to oral pharmaceutical agents, that comprises a ternary copolymer formed from about 1.1 moles of styrene, from 0.1 to 0.3 mole of methacrylic acid and about 1 mole of butyl half ester of maleic acid.

References Cited in the file of this patent

UNITED STATES PATENTS

| | | |
|---|---|---|
| 2,537,018 | Barrett | Jan. 9, 1951 |
| 2,717,247 | Contois | Sept. 6, 1955 |
| 2,798,062 | Contois | July 7, 1957 |
| 2,897,121 | Wagner | July 28, 1959 |
| 2,963,452 | Sinn et al. | Dec. 6, 1960 |
| 2,985,611 | Gaylord et al. | May 23, 1961 |